F. HEJNAL.
INKSTAND.
APPLICATION FILED MAR. 27, 1911.
1,018,189.
Patented Feb. 20, 1912.
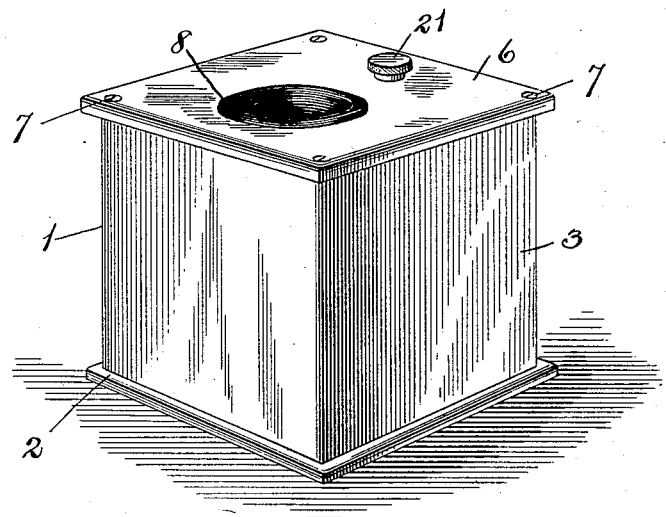
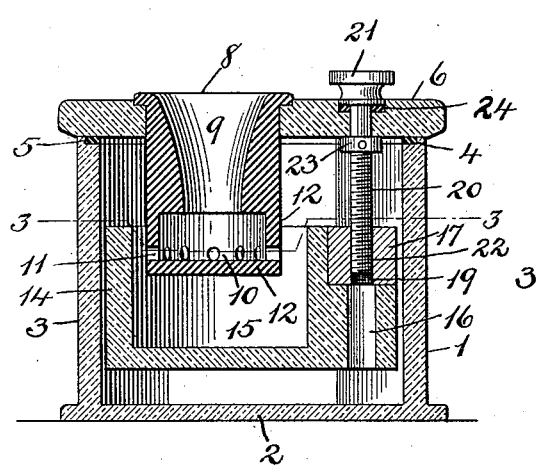
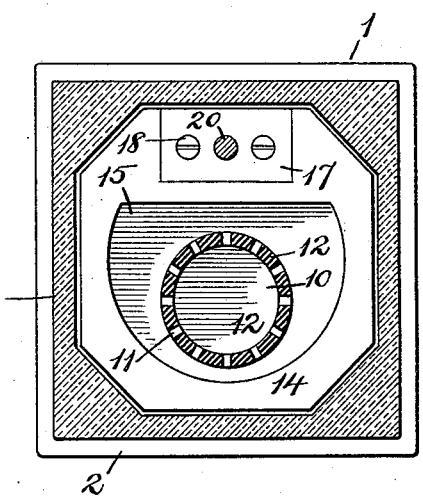
Witnesses
Edwin L. Bradford
J. Ferd. Vogt.
Inventor
Frank Hejnal
By
Mann & Co.
Attorneys

UNITED STATES PATENT OFFICE.

FRANK HEJNAL, OF BALTIMORE, MARYLAND.

INKSTAND.

1,018,189.      Specification of Letters Patent.      Patented Feb. 20, 1912.

Application filed March 27, 1911. Serial No. 617,177.

*To all whom it may concern:*

Be it known that I, FRANK HEJNAL, a citizen of the United States, residing at Baltimore, in the State of Maryland, have invented certain new and useful Improvements in Inkstands, of which the following is a specification.

This invention relates to an improved inkstand and has as one of its objects to provide an inkstand with a stationary depending dip-cup, a receptacle to contain the supply of ink and which encircles the lower end of said dip-cup, and means that will raise or lower the ink-receptacle so that the ink will more or less submerge the dip-cup, or will be entirely removed from the dip-cup.

With these and other objects in view the accompanying drawing illustrates the invention wherein, Figure 1 is a perspective view of the stand embodying the features of the invention. Fig. 2 is a vertical cross-sectional view through the same, and Fig. 3 is a horizontal sectional view through the inkstand,—the section being taken on the line 3—3 of Fig. 2.

Referring to the drawing by numerals, 1, designates the outer receptacle which may be of any suitable material, such for example as glass and comprising a bottom, 2, and side walls, 3, that extend vertically therefrom. At the upper edge the side walls, 3, are provided with a rabbet, 4, in which a gasket, 5, of any suitable material may be seated so as to effect a tight joint with the inner or under surface of the cover, 6, which seats down on said gasket and side walls. In the present instance the cover is shown secured to the side walls by means of suitable screw fastenings, 7.

By reference to Fig. 3 it will be noted that the walls of the receptacle on the inner side are of an angular formation the same in the present instance being of an octagonal form. This however is immaterial and may be varied or omitted, but it can be utilized to advantage as will presently be explained.

A dip cup, 8, is attached to the cover and depends therefrom into the receptacle and said cup is preferably formed of hard rubber with a central tapering passage, 9, that communicates at its lower end with a circular chamber, 10, at the lower end of the cup. The dip cup is provided with a plurality of perforations, 11, which extend laterally from the chamber, 10, through the wall, 12, and which are flush with the inner surface of the bottom, 13, of the cup, all for a purpose presently to be described. The stationary dip cup, 8, is not rigidly fastened to its position but merely hangs by its top flange and may readily be lifted out and away from the outer receptacle, 1.

A vertically movable ink storage container or receptacle, 14, has position in the outer receptacle, 1, and is provided with a well or chamber, 15, that has position directly beneath the depending dip cup, 8. The exterior shape of this receptacle, 14, in the present instance is also angular so as to conform to the shape of the interior walls of the outer receptacle, as best seen in Fig. 3, while the well or chamber, 15, thereof may be of any desired shape that will hold ink and also encircle the lower end of the dip cup when raised about the latter.

The inner receptacle, 14, has a vertical passage, 16, at its rear portion which extends from the bottom thereof upwardly and a block or plate, 17, is secured to the receptacle above said passage by means of screws, 18, and has a vertical screw-threaded passage 19, which registers with the passage, 16, of the receptacle, as clearly seen in Fig. 2.

A stem, 20, extends through the cover, 6, and depends into the outer receptacle, and the outer and upper end of said stem is provided with a head, 21, while the inner and lower end thereof 22, is exteriorly screw-threaded so as to screw into the passage, 19, of the block or plate, 17, and thereby said screw-threaded stem will sustain the inner receptacle between the cover, 6, and the bottom, 2, of the outer receptacle. A collar, 23, is provided on the stem, 20, immediately beneath the cover so as to prevent the stem from being drawn outwardly or from having longitudinal movement through the cover. I also prefer to provide a rubber packing, 24, about the upper end of the stem to make a comparatively tight joint to prevent the escape of ink in case the inkstand should be turned over.

The ink will be poured into the well or chamber, 15, of the inner movable receptacle, 14, either by way of the dip cup or by removing the cover as desired. During this filling operation the inner receptacle will be in its lowered position, which may readily be accomplished by turning the head, 21, and stem, 20, in the proper direction.

To put the device in condition for use, the stem will be turned so as to raise the inner receptacle and well about the lower end of the dip cup until the bottom, 12, is submerged in the ink and the latter will then flow through the perforations, 11, into the circular chamber of the dip cup. The depth of ink in the lower end of the dip cup may readily be regulated by simply turning the stem head, 21, so that it will be impossible to dip the pen farther into the ink than it is desired. As the level of the ink lowers the stem may be rotated to elevate the inner receptacle so as to maintain the proper depth of ink in the lower end of the dip cup.

Obviously the stem may be turned so as to lower the inner receptacle and thus remove all of the ink from the dip cup and then any dust or dirt that might lodge in the cup will be deposited in the bottom of the latter where it may readily be washed out by simply removing the dip cup and subjecting the latter to a washing. By this means the ink in the well will be protected.

Having thus described my invention what I claim and desire to secure by Letters Patent is,—

In an inkstand the combination of an outer receptacle having a cover at the upper side thereof; a stationary dip-cup attached to and depending from the said cover and having a bottom and perforations at its depending end; an inner receptacle having a well to contain ink and entirely inclosed within said outer receptacle and which encircles the depending end of the said stationary dip-cup, and a screw having an end exposed on the exterior of the outer receptacle and connected to said inner receptacle to raise and lower the same, whereby the ink may more or less submerge the bottom of the dip-cup or be entirely removed therefrom.

In testimony whereof I affix my signature in presence of two witnesses.

FRANK HEJNAL.

Witnesses:
  CHARLES B. MANN, Jr.,
  G. FERD. VOGT.

---

Copies of this patent may be obtained for five cents each, by addressing the "Commissioner of Patents, Washington, D. C."